No. 807,664. PATENTED DEC. 19, 1905.
E. DEBES.
BALL AND SOCKET JOINT FOR DOLLS AND THE LIKE.
APPLICATION FILED JUNE 21, 1904.
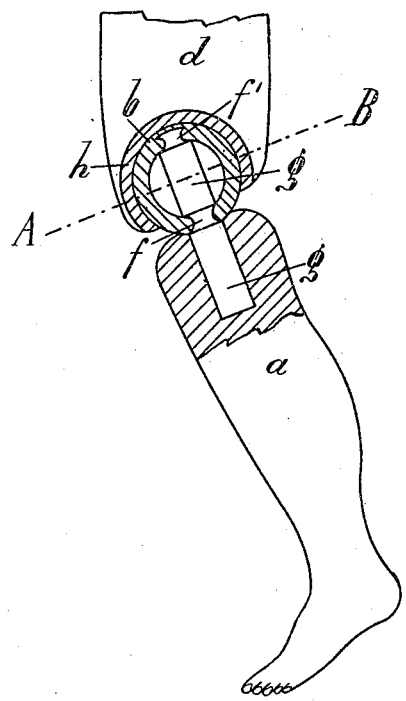
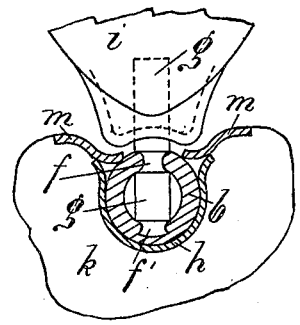
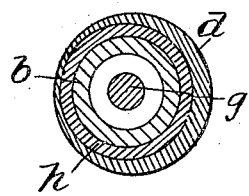

UNITED STATES PATENT OFFICE.

EDUARD DEBES, OF BLANKENESE, NEAR HAMBURG, GERMANY.

BALL-AND-SOCKET JOINT FOR DOLLS AND THE LIKE.

No. 807,664.     Specification of Letters Patent.     Patented Dec. 19, 1905.

Application filed June 21, 1904. Serial No. 213,471.

*To all whom it may concern:*

Be it known that I, EDUARD DEBES, a subject of the King of Prussia, German Emperor, residing at Blankenese, near Hamburg, Germany, have invented certain new and useful Improvements in Ball-and-Socket Joints for Dolls and the Like, of which the following is a specification.

This invention relates to an improvement in ball-and-socket joints for dolls and the like of the kind specified in Letters Patent No. 703,899, dated July 1, 1902, in which an elastic ball-socket is dispensed with and the ball is made of elastic material.

A ball-and-socket joint according to the present invention is illustrated in the accompanying drawings, in which—

Figure 1 is a longitudinal section thereof, and Fig. 2 is a cross-section on the line A B of Fig. 1. Fig. 3 illustrates the improved joint as a means of attachment of the head of a doll.

According to the present invention the ball $b$, mounted on the limb $a$ of a doll, is made hollow and elastic. It is mounted on a pin $g$, which is formed with neck-grooves $f f'$. This pin may be made in one piece with the limb $a$ or be fixed thereto. To attach the elastic hollow ball $b$ to the supporting-pin $g$, the latter is introduced into the apertures provided in the ball $b$, whereupon the material of the ball expands and then enters and fits tightly in the neck-grooves $f$ and $f'$, and thereby makes a secure connection. The ball $b$ is situated in the non-elastic ball-socket $h$ of the other limb $d$ and projects beyond its center, in the same manner as is the case in all forms of the invention forming the subject of the patent hereinbefore referred to, into the socket $h$, whereby the ball is held in place while the limb $a$ is free to move in all directions.

In introducing the elastic hollow ball $b$ into the socket $h$ of the limb $d$ the ball is squeezed together, and when it has entered the socket it is allowed to expand again and fit against the walls of the latter. The retaining-pin $g$ extends throughout the hollow ball $b$ at the place where the neck groove or perforation $f$ is situated; but it extends only partly into the wall of the hollow ball $b$ at the place of the inner neck groove or recess $f'$, so that the bearing-surface of the ball in the ball-socket is not pierced by the supporting-pin, and therefore no damage can occur to the ball-socket $h$. The pin $g$ is provided with an upper and a lower groove to engage recess $f'$ and perforation $f$, respectively.

Fig. 3 shows the application of the improved ball-and-socket joint for movably connecting the head $i$ of a doll with its body. The head $i$ carries the pin $g$, which holds the elastic hollow ball $b$ by means of its neck-grooves $f$ and $f'$. The ball-socket $h$ of trunk $k$ is partly covered over by the collar-bone $m$ of the doll, so that the hollow ball $b$ is guided also from the outside.

The improved joint may be employed for dolls, figures of animals, and the like.

What I claim is—

1. A joint for dolls and similar articles, composed of a hollow elastic perforated ball, a pin extending thereinto, and a non-elastic socket engaging the ball, substantially as specified.

2. A joint for dolls and similar articles, composed of a hollow elastic perforated ball having a recess, a grooved pin extending thereinto and engaging the recess, and a non-elastic socket engaging the ball, substantially as specified.

Signed by me at Hamburg, Germany, this 6th day of June, 1904.

EDUARD DEBES.

Witnesses:
    MAX FOUGUCH,
    PAUL CONSTRÖM.